United States Patent Office

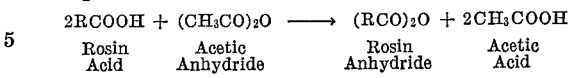

3,582,464
Patented June 1, 1971

3,582,464
AQUEOUS DISPERSIONS OF ROSIN ANHYDRIDE AND THEIR USE AS SIZING AGENTS FOR PAPER
Paul H. Aldrich, Wilmington, Del., assignor to Hercules Incorporated, Wilmington, Del.
No Drawing. Filed Apr. 10, 1967, Ser. No. 629,398
Int. Cl. C08h 11/04; D21h 3/34
U.S. Cl. 162—180                         16 Claims

ABSTRACT OF THE DISCLOSURE

Aqueous dispersions of rosin anhydride, having utility as sizing agents for paper, are prepared. The rosin anhydride is prepared by reaction of rosin and acetic anhydride.

---

This invention relates to aqueous dispersions of rosin anhydride particles and to methods for preparing the same. This invention relates also to the use of the aqueous rosin anhydride dispersions in the manufacture of sized paper.

Rosin anhydride can be prepared by reacting acetic anhydride and rosin. In accordance with this invention it has been determined that rosin anhydride, in the form of an aqueous dispersion of finely divided particles thereof, can be used as an efficient and effective internal size for paper.

This invention is directed to the manufacture of homogeneous aqueous dispersions comprised of finely divided particles of rosin anhydride, to the aqueous dispersions per se, and to their use in the manufacture of sized paper.

In accordance with this invention substantially stable homogeneous aqueous dispersions of rosin anhydride particles are prepared. These aqueous dispersions are prepared by admixing water containing a dispersing agent for rosin anhydride particles and a solution of rosin anhydride in a water-immiscible organic solvent to provide an admixture, emulsifying the admixture to proxide an oil-in-water emulsion and subsequently removing the organic solvent component thereof. Another satisfactory method to prepare the aqueous dispersions of this invention is to add to melted rosin anhydride a dispersing agent in a relatively small amount of water, with agitation, to provide a water-in-oil emulsion (the oil phase being the fused rosin anhydride), and subsequently adding water in an amount sufficient to invert the water-in-oil emulsion to an oil-in-water emulsion. The fused rosin anhydride, on cooling, solidifies in the form of relatively small particles and there is thus provided an aqueous dispersion thereof.

Aqueous dispersions of rosin anhydride prepared in accordance with this invention remain substantially homogeneous for prolonged periods of time, have good shelf life, are adapted particularly for use in the sizing of paper, and can be prepared in high solids concentration of up to about 65% by weight.

Rosin anhydride solutions used in this invention are comprised of rosin anhydride dissolved in a water-immiscible organic solvent.

Dispersant(s) or dispersing agent(s) combined with water in carrying out this invention can be an anionic, a cationic, or a nonionic surface-active agent. Rosin soaps and cationic starches are satisfactory dispersants for use in this invention. Mixtures of two or more dispersing agents can be used if desired.

Rosin anhydride used in this invention is prepared by known methods. An attempt to make rosin anhydride was reported by Fonrobert and Pallauf, Farben-Zeitung 31, 1848 (1926). Fonrobert prepared this product by treating pure abietic acid, the principal component of rosin, with acetic anhydride. The primary reaction can be represented as follows:

2RCOOH + (CH₃CO)₂O ⟶ (RCO)₂O + 2CH₃COOH
Rosin    Acetic         Rosin       Acetic
Acid     Anhydride      Anhydride   Acid The term "rosin" as used herein includes abietic acid in substantially pure form and any of the usual types of rosin such as wood rosin, gum rosin, and tall oil rosin, in a crude or a refined state. It includes also modified rosin such as disproportionated rosin; partially or substantially completely hydrogenated rosin; polymerized rosin; and formaldehyde treated rosin. Mixtures of any of the above are included in the term "rosin."

Typical analysis ef rosins that can be used in this invention are set forth in Table I below.

TABLE I

|  | Hydrogenated rosin | Topped wood rosin |
|---|---|---|
| Acid number | 166 | 166 |
| DEG saponification number | 172 | 174 |
| Drop softening point ° C | 76 | 90 |
| Percent unsaponifiables | 8.1 | 4.8 |
| Color | 1 amber |  |
| Percent abietic acid |  | 40 |
| Refractive index | 1.4952 |  |

PREPARATION OF ROSIN ANHYDRIDE

Rosin anhydride can be prepared by adding acetic anhydride to fused rosin contained in a jacketed reaction vessel equipped with a distillation column and means for agitating the contents thereof. The amount of acetic anhydride added is in excess of that required to react with the rosin. The contents of the vessel are refluxed and agitated for about 90 minutes during which time the contents of the vessel are maintained at a temperature above the melting point of the rosin. The temperature of the reaction vessel is then raised to remove substantially all unreacted acetic anhydride and all acetic acid reaction product formed. Vacuum distillation can be used to remove last traces of acetic anhydride, last traces of acetic acid, low boiling rosin neutrals, and unreacted rosin. The residue contains from about 75% to about 99% of rosin anhydride, the remainder being mainly mixed anhydrides and neutrals. Rosin anhydride dispersions can be prepared from the rosin anhydride thus produced.

The following specific procedures can be used to prepare the dispersions: (1) a mixture comprised of (a) a solution of rosin anhydride in a water-immiscible organic solvent and (b) an aqueous cationic starch solution is homogenized and the organic solvent is subsequently removed. (2) A solution of rosin anhydride in a water-immiscible organic solvent is thoroughly dispersed by homogenization in water containing a surface-active agent and the organic solvent is subsequently removed. (3) A mixture comprised of (a) a solution of rosin anhydride in a water-immiscible organic solvent and (b) water containing sufficient potassium hydroxide to give a maximum of 2% potassium resinate is homogenized and the organic solvent is subsequently removed. (4) Aqueous potassium hydroxide is added to molten rosin anhydride in an amount sufficient to provide, by weight, from about 1% to 8% potassium resinate. Water is then added in an amount to provide, by inversion, an oil-in-water type emulsion. A dispersion is subsequently formed upon solidification of the molten rosin anhydride particles.

The water-immiscible organic solvent employed for the rosin anhydride can be a single solvent or a mixture of solvents. In general any solvent or solvent mixture which, when mixed with water, will separate therefrom to form a two-layer system, one layer being an aqueous phase and the other layer being an organic solvent phase, is suitable for use. Suitable solvents and solvent mixtures include aromatic hydrocarbon solvents such as benzene, toluene, and xylene; aliphatic hydrocarbon solvents such as hexane, heptane, octane, and nonane; alicyclic hydrocarbon solvents such as cyclohexane, methylcyclohexane, α-pinene, paramenthane, and turpentine, and mixtures thereof. The above typical solvents and solvent mixtures are considered to be substantially water-immiscible and can be used satisfactorily in carrying out this invention. It is within the skill of those versed in the art to provide other suitable solvents and solvent mixtures for the rosin anhydride.

In preparing the solutions of rosin anhydride and solvent, the amount of solvent employed is within the skill of those versed in the art and will be that required to dissolve all the rosin anhydride. Usually the solutions employed in carrying out this invention will have a solids content of from about 40% to 85% by weight, the balance, 60% to 15%, being solvent.

After preparation the solution is thoroughly admixed with water and dispersing agent, homogenized, and then vacuum stripped to remove substantially all organic solvent whereby there is provided a substantially homogeneous aqueous rosin anhydride dispersion.

In the preparation of the aqueous rosin anhydride dispersions using a cationic starch has the dispersing agent, the cationic starch is first cooked in water at about 90° C. to 95° C. for about 15 minutes. The resulting starch solution is then cooled to about 60° C. to 65° C. prior to admixing it with rosin anhydride solution. The mixture of starch, water, and rosin anhydride solution is then homogenized to form an oil-in-water emulsion. Subsequent removal of the rosin anhydride solvent from the emulsion, preferably by distillation under vacuum, provides an aqueous rosin anhydride dispersion.

The upper limit of cationic starch concentration of the starch solution is that determined by the viscosity of the starch solutions which limit handling. This can be determined readily by one skilled in the art. However, as a guide, the upper limit for most cationic starches is about 6% by weight based on the weight of the starch solution. As regards the lower limit of cationic starch concentration, satisfactory emulsions can be prepared with about 0.5% starch. Smaller amounts of starch of the order of about 0.1% can be used if desired.

The ratio of rosin anhydride to cationic starch utilized in the preparation of the dispersions of this invention can vary from about 1.0:0.33 to about 1:4. The preferred range is from about 1:1 to about 1:2.

Cationic modified starches particularly satisfactory for use in this invention have the formula (I)
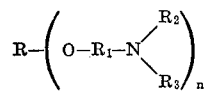

wherein R is the starch molecule, $R_1$ is selected from the group consisting of alkylene, hydroxy alkylene, phenyl alkylene, and alkyl alkylene, $R_2$ and $R_3$ are each selected from the group consisting of alkyl, aryl, aralkyl, cycloalkyl, and hydrogen, and $n$ is the degree of substitution of the starch molecule.

Cationic modified starches represented by the above formula can be prepared by etherifying ungelatinized starch as well as starch derivatives including dextrinized starch, hydrolyzed starch, oxidized starch and the like, with an etherifying agent selected from the group consisting of dialkylaminoalkyl epoxides, dialkylaminoalkyl halides, and the corresponding compounds containing aryl groups in addition to the alkyl groups.

Representative examples of suitable etherifying agents that can be used herein include β-dimethylaminoethyl chloride; β - diethylaminoethyl chloride; β - dimethylaminoisopropyl chloride; 3-dibutylamino-1,2-epoxypropane; 2-bromo - 5 - diethylaminopentane hydrobromide; N-(2,3-epoxypropyl) piperidine; and N,N-(2,3-epoxypropyl) methyl aniline. The various halides (e.g., chloro- and bromo-) can be used interchangeably. Instead of the free amines (e.g., β-diethylaminoethyl chloride), the hydrochloride or other salts of these reagents can also be used. It will also be evident that besides the alkyl, aryl, and aralkyl types, etherifying agents containing cyclic groups can also be used.

In the preparation of rosin anhydride dispersions using a surface-active agent, the rosin anhydride solution is first prepared by dissolving the rosin anhydride in the water-immiscible organic solvent. This solution is then blended with water containing a surface-active agent or mixtures of two or more. The amount of water containing a surface-active agent used is from about 0.5 to about 4.0 times the weight of the rosin anhydride solution. The surface-active agent is from about 0.1% to 10.0% by weight, based on the weight of the rosin anhydride, and preferably from about 0.5% to about 8.0%. Cationic, anionic, and nonionic surface-active agents, and mixtures thereof, are suitable in preparing the rosin anhydride dispersions using this method.

Examples of anionic surface-active agents which are useful in the preparation of rosin anhydride dispersions include the ammonium salts of the sulfate esters of an alkylphenoxy poly(ethyleneoxy) ethanol, the sodium salt of condensed naphthalene sulfonic acid, sodium alkyl aryl sulfonates, sodium lauryl sulfate, sodium alkyl ether sulfate, sodium dodecyl diphenyl ether disulfonate, and sodium oleyl methyl taurate. Mixtures of two or more anionic surface-active agents can be used if desired.

Examples of cationic surface-active agents which are useful in the preparation of rosin anhydride dispersions include the stearyl dimethyl benzyl ammonium chloride, dicoco dimethyl ammonium chloride-stearyl dimethyl amine oxide, dodecyl benzene chloride, cetyl dimethyl benzyl ammonium chloride, oleyl dimethyl amine oxide, and stearyl dimethyl amine oxide. Mixtures of two or more cationic surface-active agents can be used if desired.

Examples of nonionic surface-active agents which are useful in the preparation of rosin anhydride dispersions include polyoxyethylene derivatives of sorbitan monolaurate, sorbitan monopalmitate, sorbitan monostearate, octylphenoxy polyethoxyethanol, aliphatic ethoxylate, and alkyl polyether alcohol. Mixtures of two or more nonionic surface-active agents can be used if desired.

In another method for preparation of dispersions of rosin anhydride, dilute potassium hydroxide is added to the rosin anhydride solution prepared as previously described. The concentration of the aqueous potassium hydroxide solution is from about 0.1% to about 0.5% by weight of potassium hydroxide based on the weight of the solution. Sufficient potassium hydroxide solution is added to give a maximum of 2% potassium resinate. Other satisfactory bases which can be used include sodium hydroxide, lithium hydroxide, pyridine trimethylamine, and tetramethyl ammonium hydroxide.

Satisfactory dispersions of rosin anhydride can also be made by inversion. In this method the rosin anhydride is heated above its melting point (to about 100° C.) and a 10–15% potassium hydroxide aqueous solution is added in an amount to give a maximum of 8% potassium resinate. Immediately following the addition of the potassium hydroxide solution, water is added with vigorous agitation to bring about inversion to an oil-in-water emulsion. This method is also applicable to making rosin anhydride dispersions using anionic, cationic and nonionic surface-active agents. The rosin anhydride is heated above its melting point, and a surface-active agent is added to the anhydride. Water is immediately added until inversion occurs. The amount of surface-active agent required is from 0.5% to 5.0% by weight based on the weight of rosin anhydride. Water is used as a carrier for the surface-active agent.

Known means for agitation can be employed to provide homogeneous oil-in-water type emulsions. Suitable means include homogenizers, a Waring Blendor and the like. Passage of a mixture of rosin anhydride solution, water and dispersing agent through a homogenizer at from 1000–4500 p.s.i. provides highly satisfactory results. After an oil-in-water emulsion has been prepared, any organic solvent present is substantially all removed by distillation, preferably under vacuum.

While aqueous dispersions of rosin anhydride of this invention can be used in surface sizing of paper, they are particularly advantageous when utilized as internal sizing additives. Since the bulk of commercial paper is sized by internal addition, the importance of this will be obvious. When utilized for internal sizing, these aqueous dispersions are added to an aqueous pulp suspension at any point prior to sheet formation. It is preferable to add them as close to the point of sheet formation as possible. On a paper machine this would be at a point between and including the intake side of the fan pump and head box. The dispersions can be added to the pulp suspension at any convenient concentration. This concentration will be dictated by the rate of paper production, method of metering and concentration of emulsion preparation.

The amount of rosin anhydride dispersion added to the aqueous pulp suspension should be such that the cellulosic fibers absorb thereon from about 0.05% to about 2.0% by weight of rosin anhydride based on the dry weight of the fiber.

The rosin anhydride dispersions can be used with or without alum at a pH of from about 4.0–9.0. It is preferred to use the dispersions without alum and at a pH of from about 6.5 to 8.5. These dispersions, once prepared, can be diluted with water to any convenient solids concentration level.

The following examples further illustrate this invention. All parts and percentages are by weight unless otherwise specified.

EXAMPLE 1

Hydrogenated rosin of Table I, 249.5 parts, is melted and then added to a vessel equipped with a distillation column. The vessel is heated and stirred with 108 parts of acetic anhydride while holding the temperature between 120–130° C. The temperature is raised and unreacted acetic anhydride and acetic acid reaction product are taken overhead. Overhead temperature varies from about 122° C. initially to about 137° C. at completion. Distillation is continued at about 10–12 mm. of Hg to a bottoms temperature of 250° C. Distillation is then continued at 0.2 mm. vacuum to a bottoms temperature of 250° C. The rosin anhydride reaction mass has the following properties:

| | |
|---|---|
| Acid number | 4.0 |
| DEG saponification number | 185 |
| Drop softening point, ° C. | 70 |
| Percent unsaponifiables | 12.5 |

EXAMPLE 2

A solution (1) is prepared by dissolving 3.5 parts of Table I hydrogenated rosin in 692 parts of benzene. A solution (2) is prepared by admixing 348 parts of solution (1) with 348 parts of benzene. A solution (3) is prepared by admixing 348 parts of solution (2) with 348 parts of benzene.

A solution (4) is prepared by dissolving 3.5 parts of the Example 1 rosin anhydride reaction mass in 692 parts benzene. A solution (5) is prepared by admixing 348 parts of solution (4) with 348 parts of benzene. A solution (6) is prepared by admixing 348 parts of solution (5) with 348 parts benzene.

The six solutions are used to tub size mill made bleached kraft waterleaf sheet made from Georgian brand pulp of Rayonier. Each sheet is drum dried 60 seconds at 250° C. Size efficiency results are set forth in Table II below. It will be seen that hydrogenated rosin does not size paper while rosin anhydride prepared therefrom does.

TABLE II

| | Photometer sizing (sec.) standard feather ink | | |
|---|---|---|---|
| Amount of applied sizing agent percent | 0.2 | 0.1 | 0.05 |
| Sizing agent: | | | |
| Rosin: | | | |
| Treated paper aged 18 days at room temperature | 0 | 0 | 0 |
| Treated paper cured 1 hour at 105° C | 0 | 0 | 0 |
| Rosin anhydride: | | | |
| Treated paper aged 18 days at room temperature | 41 | 7 | 1 |
| Treated paper cured 1 hour at 105° C | 785 | 444 | 41 |

EXAMPLE 3

Rosin anhydride reaction mass having the same properties as that of Example 1, 250 parts, is dissolved in 250 parts of benzene to provide a solution which is blended with 1000 parts water containing 4.3 parts of the ammonium salt of the sulfate ester of an alkylphenoxy poly-(ethyleneoxy) ethanol, available commercially under the proprietary designation Alipal CO-436. The blend is homogenized twice at 3,500 to 4,000 p.s.i. and is vacuum stripped to remove substantially all benzene (some water is also removed during this period), leaving a 50% total solids dispersion. Portions of the dispersion are diluted with water to provide an aqueous dispersion of 3% solids content. Handsheets are prepared using the 3% solids dispersion as an internal sizing agent. The dispersion is added to the size crock and handsheets are prepared with Rayonier bleached kraft pulp using a standard alum procedure to adjust the pH of the size crock. Size results, using various amounts of size, are set forth in Table III below.

TABLE III

| | Photometer sizing (sec.) standard feather ink | | | |
|---|---|---|---|---|
| Amount of size added based on dry pulp weight, percent | 0.5 | 1.25 | 2.00 | 3.00 |
| pH 4.5 of sheet formation: | | | | |
| Sized paper (2 days old—no heat treatment) | 2 | 8 | 14 | 34 |
| Sized paper (heated 1 hour at 105° C.) | 14 | 68 | 94 | 167 |
| pH 5.5 of sheet formation: | | | | |
| Sized paper (2 days old—no heat treatment) | 2 | 12 | 25 | 48 |
| Sized paper (heated 1 hour at 105° C.) | 18 | 168 | 199 | 352 |

EXAMPLE 4

Acetic anhydride is reacted with Table I topped wood rosin to provide a rosin anhydride reaction mass having an acid number of 20, a DEG saponification number of 191, and containing 12.2% of unsaponifiables.

Eight hundred (800) parts of this rosin anhydride reaction mass is dissolved in 800 parts benzene. To this solution is added 100 parts of 0.5 normal KOH in 1500 parts water to provide a blend. After vigorous stirring the blend is homogenized twice at 3500–4000 p.s.i. The resulting dispersion is stripped of benzene under vacuum using a warm water bath (46–47° C.). Final pressure is 45 mm. Hg with pot temperature at 42° C. The dispersion pH is adjusted from 6 to 7, by addition of 25 parts of 0.5 normal KOH. The product is filtered through a 325 mesh screen which results in a dispersion of 30.7% solids content. To this dispersion is added nine parts of a 20% Dowicide G solution (primarily sodium pentachlorophenate plus the sodium salts of other chlorophenols). The resulting dispersion is substantially homogeneous, has good shelf life and has excellent utility as an internal size agent in the manufacture of sized paper.

EXAMPLE 5

Cationic starch (D.S. 0.03), available commercially as Cato-2 starch, 16.5 parts, is cooked in 450 parts of water. To this starch solution is added 50 parts of the Example 4 potassium resinate stabilize rosin anhydride emulsion diluted with 450 parts water. The final weight is adjusted to 1000 parts by addition of water. The ratio of rosin anhydride to cationic starch is 1:1. To another 50 part portion of potassium resinate stabilized rosin anhydride emulsion is added 33 parts of the cationic starch cooked in 900 parts of water and adjusted to a total weight of 1500 parts. The ratio of rosin anhydride to cationic starch is 1:2. Chesapeake unbleached kraft pulp is sized with these emulsions at a pH of 8.0. Sizing results are as set forth in Table IV below.

TABLE IV

| | Percent size | Standard feather ink flotation to 25% penetration | | |
|---|---|---|---|---|
| | | Paper aged 24 hours at room temp. (about 23° C.) | Paper aged 7 days at room temp. (about 23° C.) | Paper aged 1 hour at 105° C. |
| 1:1 rosin anhydride/starch | .15 | 1,540 | 1,670 | 3,050 |
| 1:2 rosin anhydride/starch | .15 | 2,210 | 2,150 | 3,360 |

EXAMPLE 6

Thirty (30) parts of cationic starch (D.S. 0.03), available commercially as Cato 8 starch, is cooked in 900 parts distilled water at 90–95° C. for 15 minutes. The solution is cooled to 65° C. and 40 parts distilled water added. Thirty (30) parts of rosin anhydride reaction mass of Example 1 in 13 parts of benzene is added to the solution. The mixture is blended and then homogenized twice in a Mantin-Gaulin homogenizer at 3800 p.s.i. The mixture is then stripped of benzene at 40–50° C. at 45 mm. Hg. The resulting dispersion contains 5.9% total solids. The dispersion is centrifuged 15 minutes (1600 r.p.m.) and decanted to give 5.2% total solids. The dispersion is homogeneous and is highly satisfactory as an internal sizing agent for use in the manufacture of sized paper.

The commercial cationic starches used in Examples 5 and 6 have the formula

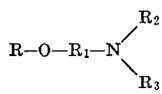

in which R is starch, $R_1$ is ethylene, and $R_2$ and $R_3$ are each selected from methyl or ethyl groups.

EXAMPLE 7

Rayonier bleached kraft pulp (pH 7.4, beaten to 750 Schopper-Riegler freeness) is diluted with pH 7.0 water to give pulp at 0.27% concentration in the proportioner. Aliquots of this pulp are taken and mixed with 60 parts of emulsion as prepared in Example 6 and diluted as follows:

Emulsion 1: 97 parts Example 6 emulsion diluted to 1000 parts with water
Emulsion 2: Emulsion 1 diluted 1:1 with water
Emulsion 3: Emulsion 2 diluted 1:1 with water.

After brief but thorough mixing, the aliquot is diluted in the sheet mold and the sheet formed, pressed and dried. At the end of each 12 sheet set the white water pH is 7.4 to 7.6. Table V below summarizes size test results.

TABLE V

| Amount of rosin anhydride added | Photometer sizing (sec.) standard feather ink | |
|---|---|---|
| | 3-day aging | Aged 1 hour/ 105° C. |
| % (Emulsion 1) | 78 | 371 |
| % (Emulsion 2) | 44 | 478 |
| % (Emulsion 3) | 24 | 198 |

EXAMPLE 8

Rosin anhydride reaction mass similar to that of Example 1, 200 parts, is dissolved in 200 parts of benzene to provide a solution which is then blended with 400 parts water containing 4 parts of the micropulverized sodium salt of condensed naphthalene sulfonic acid, available commercially as Tamol SN. The blend is homogenized twice at 3500–4000 p.s.i. using about 200 parts water to rinse the homogenizer and is vacuum stripped to remove benzene. Some water is removed during benzene removal and the resulting dispersion has a solids content of about 30%. The dispersion is homogeneous, has good shelf life, and is a good internal sizing agent for paper.

EXAMPLE 9

Rosin anhydride reaction mass similar to that of Example 1, 200 parts, is dissolved in 200 parts of benzene, and then blended with 400 parts water containing 4 parts of the polyoxyalkylene derivative of sorbitan monolaurate, sold under the trade name of Tween 20. The blend is homogenized twice at 3500–4000 p.s.i. using about 200 parts water to rinse the homogenizer and is vacuum stripped to remove benzene and water having about 30% total solids dispersion.

EXAMPLE 10

Rosin anhydride reaction mass similar to that of Example 1, 200 parts, is dissolved in 200 parts of benzene, and then blended with 400 parts water containing 16 parts (25% total solids) of stearyl dimethyl benzyl ammonium chloride, sold under the trade name of Triton X–400. The blend is homogenized twice at 3500–4000 p.s.i. using about 200 parts water to rinse the homogenizer and is vacuum stripped to remove benzene and water having about 30% total solids dispersion.

EXAMPLE 11

Rosin anhydride reaction mass similar to that of Example 1, 200 parts, is dissolved in 200 parts of benzene, and then blended with 400 parts water containing 8 parts (50% total solids) of dicoco dimethyl ammonium chloride, sold under the trade name of Arquad–2C. The blend is homogenized twice at 3500–4000 p.s.i. using about 200 parts water to rinse the homogenizer and is vacuum stripped to remove benzene and water having about 30% total solids dispersion.

EXAMPLE 12

One hundred (100) parts of rosin anhydride reaction mass similar to that of Example 1 is heated to 100° C. The hot resin is vigorously stirred and 1.5 parts of potassium hydroxide in 15 parts of water is added. This is followed by 65 parts of water at 60–65° C. which is followed with sufficient water at room temperature to give a dispersion with 40% total solids. Inversion occurs toward the end of the room temperature water addition. The dispersions are applied in handsheet sizing of Rayonier bleached kraft pulp using a standard alum procedure at about 3.00%, 2.00%, 1.25%, and 0.50% sizing levels. Sizing efficiency is set forth in Table VI below.

TABLE VI

| | Photometer sizing (sec.) standard feather ink | | | |
|---|---|---|---|---|
| | 0.50% | 1.25% | 2.00% | 3.00% |
| pH 4.5: | | | | |
| Paper aged 2 days at room temperature (about 23° C.) | 5 | 28 | 65 | 151 |
| Paper aged 1 hour at 105° C. | 23 | 127 | 190 | 332 |
| pH 5.5: | | | | |
| Paper aged 2 days at room temperature (about 23° C.) | 6 | 43 | 87 | 159 |
| Paper aged 1 hour at 105° C. | 92 | 212 | 363 | 472 |

Thus, in accordance with this invention, there are provided novel aqueous dispersions of rosin anhydride particles which are adapted particularly for use in the manufacture of paper by internal sizing techniques. The aqueous dispersions of this invention are stable for long periods of time and are comprised of from about 95% to about 35% water and from about 5% to about 65% solids, said solids being comprised of rosin anhydride particles and a dispersing agent for the rosin anhydride particles. The rosin anhydride particles of which the dispersed phase is comprised are relatively small and will have a particle size of from about 0.03 micron to about 3 microns, at least about 20% of which have a particle size of less than about 0.3 micron.

The rosin anhydride is derived by reaction of rosin and at least a stoichiometric amount of acetic anhydride. The rosin anhydride is a good size for paper products. As above set forth, soaps of the rosin anhydride, in relatively small amounts, can serve as a dispersing agent for the rosin anhydride particles. The soaps can be formed in situ by adding a relatively small amount of an alkaline material, preferably in a water carrier, such as inorganic and organic base materials. Such materials include lithium hydroxide, sodium hydroxide, potassium hydroxide, lithium carbonate, sodium carbonate, potassium carbonate, ammonia, pyridine trimethylamine, and tetramethyl ammonium hydroxide as mentioned above.

Percentages set forth in the specification, unless otherwise set forth, are by weight. It is to be understood that the above description and examples are illustrative of this invention and not in limitation thereof.

What I claim and desire to protect by Letters Patent is:

1. A substantially stable aqueous dispersion of finely divided particles, said aqueous dispersion being comprised of, by weight, from about 95% to about 35% water and from about 5% to about 65% solids, said solids being comprised of rosin anhydride particles and a dispersing agent for the rosin anhydride particles.

2. The aqueous dispersion of claim 1 wherein the dispersing agent is a surface active agent selected from the group consisting of cationic surface active agents, anionic surface active agents, nonionic surface active agents, and mixtures thereof.

3. The aqueous dispersion of claim 1 wherein the dispersing agent is a cationic starch.

4. The aqueous dispersion of claim 1 wherein the dispersing agent is a rosin anhydride soap.

5. The aqueous dispersion of claim 4 wherein the rosin anhydride soap is the potassium soap.

6. In the process of manufacturing sized paper employing an aqueous size composition as the sizing agent, the improvement wherein there is employed as the aqueous size composition a substantially stable aqueous dispersion of finely divided particles, said aqueous dispersion being comprised of, by weight, from about 95% to about 35% water and from about 5% to about 65% solids, said solids being comprised of rosin anhydride particles and a dispersing agent for the rosin anhydride particles.

7. The process of claim 6 wherein the dispersing agent is a surface active agent selected from the group consisting of cationic surface active agents, anionic surface active agents, nonionic surface active agents, and mixtures thereof.

8. The process of claim 6 wherein the dispersing agent is a cationic starch.

9. The process of claim 6 wherein the dispersing agent is a rosin anhydride soap.

10. The process of claim 9 wherein the rosin anhydride soap is the potassium soap.

11. In the process of manufacturing sized paper sheeting wherein there is employed in admixture with an aqueous suspension of papermaking fibers an aqueous size composition, followed by sheeting of the thus prepared admixture, and drying of the prepared sheeting, the improvement wherein there is employed as the aqueous size composition a substantially stable aqueous dispersion of finely divided particles, said aqueous dispersion being comprised of, by weight, from about 95% to about 35% water and from about 5% to about 65% solids, said solids being comprised of rosin anhydride particles and a dispersing agent for the rosin anhydride particles.

12. The process of claim 11 wherein the dispersing agent is a surface active agent selected from the group consisting of cationic surface active agents, anionic surface active agents, nonionic surface active agents, and mixtures thereof.

13. The process of claim 11 wherein the dispersing agent is a cationic starch.

14. The process of claim 11 wherein the dispersing agent is a rosin anhydride soap.

15. The process of claim 14 wherein the rosin anhydride soap is the potassium soap.

16. A paper product produced in accordance with claim 11.

References Cited

UNITED STATES PATENTS

| | | | |
|---|---|---|---|
| 2,195,600 | 4/1940 | Reilly | 162—175X |
| 2,357,917 | 9/1944 | Stull et al. | 106—238X |
| 2,385,794 | 10/1945 | Chappell | 106—238X |
| 2,717,224 | 9/1955 | McConnell et al. | 106—238X |
| 3,390,046 | 6/1968 | McDavid | 162—180 |
| 3,102,065 | 8/1963 | Thurlow | 162—175 |
| 2,326,610 | 8/1943 | Borglin | 106—238X |
| 2,628,918 | 2/1953 | Wilson et al. | 260—101X |
| 3,211,683 | 10/1965 | Arakawa et al. | 106—238X |

S. LEON BASHORE, Primary Examiner

F. FREI, Assistant Examiner

U.S. Cl. X.R.

106—238; 162—175; 260—97